United States Patent
Bauer

(10) Patent No.: US 9,316,290 B2
(45) Date of Patent: Apr. 19, 2016

(54) EPICYCLIC GEARING WITH A GEARING HOUSING

(71) Applicant: Robert Bosch GmbH, Stuttgart (DE)

(72) Inventor: Gerhard Bauer, Witten (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 14/358,844

(22) PCT Filed: Oct. 24, 2012

(86) PCT No.: PCT/EP2012/004432
§ 371 (c)(1),
(2) Date: Sep. 29, 2014

(87) PCT Pub. No.: WO2013/072004
PCT Pub. Date: May 23, 2013

(65) Prior Publication Data
US 2015/0038284 A1    Feb. 5, 2015

(30) Foreign Application Priority Data

Nov. 18, 2011    (DE) .......................... 10 2011 118 832

(51) Int. Cl.
*F16H 57/08*    (2006.01)
*F16H 1/46*    (2006.01)
*F16H 1/28*    (2006.01)

(52) U.S. Cl.
CPC ............... *F16H 1/46* (2013.01); *F16H 1/2827* (2013.01); *F16H 57/082* (2013.01); *F05B 2260/40311* (2013.01)

(58) Field of Classification Search
None
See application file for complete search history.

(56) References Cited

U.S. PATENT DOCUMENTS 3,986,413 A * 10/1976 Stockton .......................... 475/54
4,114,475 A * 9/1978 Orshansky et al. ............. 475/81

(Continued)

FOREIGN PATENT DOCUMENTS

| DE | 10 2009 016 329 A1 | 10/2010 |
|---|---|---|
| EP | 1 184 567 A2 | 3/2002 |
| EP | 1 240 443 B1 | 9/2002 |
| EP | 2072863 A1 * | 6/2009 |
| WO | 01/50038 A1 | 7/2001 |
| WO | 2008/104258 A1 | 9/2008 |

OTHER PUBLICATIONS

International Search Report corresponding to PCT Application No. PCT/EP2012/004432, mailed Jan. 28, 2013 (German and English language document) (5 pages).

*Primary Examiner* — Justin Holmes
(74) *Attorney, Agent, or Firm* — Maginot Moore & Beck LLP

(57) ABSTRACT

A planet stage of an epicyclic gearing includes a gearing housing with a ring gear arranged in a fixed position, at least two planet wheels mounted in a planet web that has at least one cheek, and a sun wheel. The planet web is connected to an input shaft, and there is a connection between the input shaft and a component of a further planet stage. The planet stage of the epicyclic gearing, in particular the planet web, has a reduced torsional loading. The reduced torsional loading is achieved in that the connection is a connecting web which is connected to that cheek of the planet web which is acted upon by an admission of load/moment, and is arranged in the region between two planet wheels and within the ring gear.

16 Claims, 3 Drawing Sheets

(56) References Cited

U.S. PATENT DOCUMENTS

| | | | |
|---|---|---|---|
| 4,417,485 A * | 11/1983 | Boor | 475/330 |
| 2011/0263370 A1 * | 10/2011 | Borntraeger et al. | 475/5 |
| 2012/0035014 A1 * | 2/2012 | Moeller | 475/5 |
| 2012/0091725 A1 * | 4/2012 | Yoshida et al. | 290/55 |
| 2014/0141930 A1 * | 5/2014 | Gerke et al. | 475/331 |

* cited by examiner

EPICYCLIC GEARING WITH A GEARING HOUSING

This application is a 35 U.S.C. §371 National Stage Application of PCT/EP2012/004432, filed on Oct. 24, 2012, which claims the benefit of priority to Serial No. DE 10 2011 118 832.4, filed on Nov. 18, 2011 in Germany, the disclosures of which are incorporated herein by reference in their entirety.

BACKGROUND

The disclosure relates to a planetary stage of a planetary gear mechanism having a gear mechanism housing, in which a fixedly arranged internal gear, at least two planetary gears which are mounted in a planet spider which has at least one cheek, and a sun gear are arranged, the planet spider being connected to an input shaft, and there being a connection between the input shaft and a component of a further planetary gear mechanism.

A planetary gear mechanism of this type having a plurality of planetary stages is known from WO2008/104258 A1. The planetary gear mechanism is designed for a wind power plant which converts kinetic energy of the wind into electrical energy and feeds it into a power network. The planetary stages of the planetary gear mechanism interact with one another, a division of load taking place from a rotor shaft to a first planetary stage and, around the outside of the internal gear of the first planetary stage, to a second planetary stage. This configuration enlarges the overall volume of the planetary gear mechanism and therefore increases the weight of the planetary gear mechanism as a result of the necessary solid configuration. In addition, the running behavior of the planetary gear mechanism is influenced in a disadvantageous manner as a result of the high masses which are to be moved.

A further planetary gear mechanism is known from EP 1 240 443 B1. Said planetary gear mechanism likewise has a first planetary stage which is connected to a rotor shaft, in which first planetary stage the planet spider of the first planetary stage is connected to the internal gear of a second planetary stage. This embodiment is generally customary and is used in planetary gear mechanisms which are installed, for example, in wind power plants.

SUMMARY

The disclosure is based on the object of providing a planetary stage of a planetary gear mechanism, in which the torsion loading of a planet spider of the planetary stage is reduced.

This object is achieved by virtue of the fact that the connection is a connecting web which is arranged in the region between two planetary gears and within the internal gear and is connected to the cheek of the planet spider, which cheek is loaded by an introduction of load/torque. In this embodiment, the load which is to be transmitted to a further planetary stage is guided as a result past the planet spider of the first planetary stage in the region between two planetary gears and is transmitted to the further planetary stage. As a result, firstly no load routing around the internal gear of the first planetary stage is necessary, and the first planet spider is loaded only by its own torsion which leads at least to reduced tilting and/or oblique positioning of the planetary gear bolts of the first planetary stage.

In one development of the disclosure, the number of connecting webs corresponds to the number of planetary gears. In particular, the first planetary stage of the planetary gear mechanism has three planetary gears, and three connecting webs are correspondingly provided between the planetary gears within the internal gear. This configuration has proven particularly suitable for connecting the second planetary stage to the first planetary stage.

In a further embodiment of the disclosure, the connecting web is configured in one piece with that cheek of the planet spider which is loaded by the introduction of load/torque. The planet spider and the connecting web or the connecting webs are preferably configured as a single-piece cast part, it being possible for the connecting webs to be produced by way of a simple modification of the corresponding casting mould.

In a further embodiment of the disclosure, a division of load/torque to the connecting web and to the planet spider or to the opposite cheek of the planet spider takes place in the cheek which is loaded with the introduction of load/torque. If, for example, the planetary stage is part of a wind power plant gear mechanism, as will be explained in the following text, the cheek which is loaded by the introduction of load/torque is connected to the rotor side and the opposite cheek is connected to the generator side of the wind power plant (in each case if required via further gear mechanism stages or planetary stages). In summary, the division of load/torque according to the disclosure therefore takes place within the internal gear diameter of the planetary stage, as it were in the "empty spaces" between the planetary gears, and does not enlarge the overall volume.

In one development of the disclosure, the connecting webs are connected to a connecting ring. The connecting ring can be configured as a continuous closed ring or else as an interrupted ring in the form of ring segments. The connecting ring is correspondingly arranged on the opposite side to the cheek which is loaded by the introduction of load/torque, and, for unproblematic assembly, has an external diameter which is smaller than the internal diameter of the internal gears of the first and also the second planetary stage. The assembly of the planetary gear mechanism with the individual planetary stages is therefore not impeded in any way. The connecting ring with a total of three connecting webs is preferably configured as a single-piece cast part, whereby the input shaft, the planet spider (with the two cheeks), the connecting webs and the connecting ring are therefore configured in one particularly advantageous embodiment as one component in the form of a machined cast part.

In one development of the disclosure, the connecting web or the connecting ring is connected to an internal gear or a planet spider of the further planetary stage via a positively locking or frictional connection, in particular via a plug-in connection. A connection of this type contributes to unproblematic assembly of the individual gear mechanism stages, it being possible for the latter to be arranged, for example, in independent housing components.

In a further embodiment of the disclosure, the plug-in connection is configured as an externally toothed ring which is formed on the connecting ring and as an internally toothed ring which is arranged on the internal gear or the planetary gear carrier. This combination has proven particularly suitable, both the production and the assembly being simplified as a result.

In one development of the disclosure, the planetary gear mechanism having the planetary stage which is configured according to the disclosure is a continuous flow power plant gear mechanism, in particular an ocean current power plant gear mechanism or a wind power plant gear mechanism. A wind power plant is particularly preferably equipped with a wind power plant gear mechanism of this type.

BRIEF DESCRIPTION OF THE DRAWINGS

Advantageous developments of the disclosure can be gathered from the description of the drawings, in which one exemplary embodiment of the disclosure which is shown in the figures is described in greater detail.

In the drawings.

DETAILED DESCRIPTION

Figure 1:
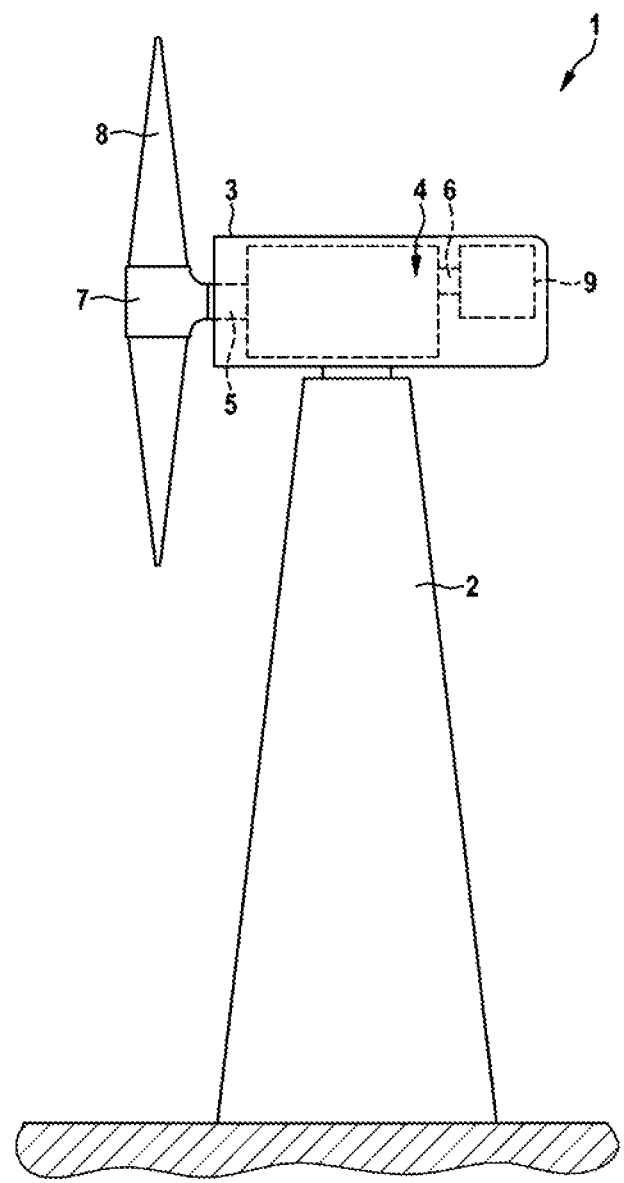
FIG. 1 shows a side view of a wind power plant having a gear mechanism which has a planetary stage, configured according to the disclosure, of a planetary gear mechanism.

FIG. 1 shows a side view of a wind power plant 1 with its essential assemblies. The wind power plant 1 has a tower 2, on which a nacelle 3, in the form of a machine housing, which is mounted such that it can be rotated about a vertical axis, is arranged. A gear mechanism 4 is fastened in a rotationally fixed manner in the nacelle 3, the gear mechanism 4 having a drive shaft 5 and an output shaft 6. The drive shaft 5 of the gear mechanism 4 is connected to a hub 7 of a rotor which has a plurality of rotor blades 8. The output shaft 6 is rotationally connected to a drive apparatus to be driven in the form of a generator 9. The gear mechanism 4 is designed in such a way that it converts a slow rotational movement of the drive shaft 5 into a rapid rotational movement of the output shaft 6. Electrical energy is generated by means of the wind power plant 1, by the rotor which is set in rotational movement by the wind introducing the rotational movement via the drive shaft 5 into the gear mechanism 4. The gear mechanism 4 has, in particular, a planetary gear mechanism with a first planetary stage 10 and a second planetary stage which are connected to a summing gear mechanism. The summing gear mechanism is connected to the output shaft 6, optionally via a spur gear mechanism, and converts the rotational movement into a more rapid rotational movement. Finally, the rapid rotational movement is transmitted via the output shaft 6 to the generator 9 in order to generate power.

Figure 2:
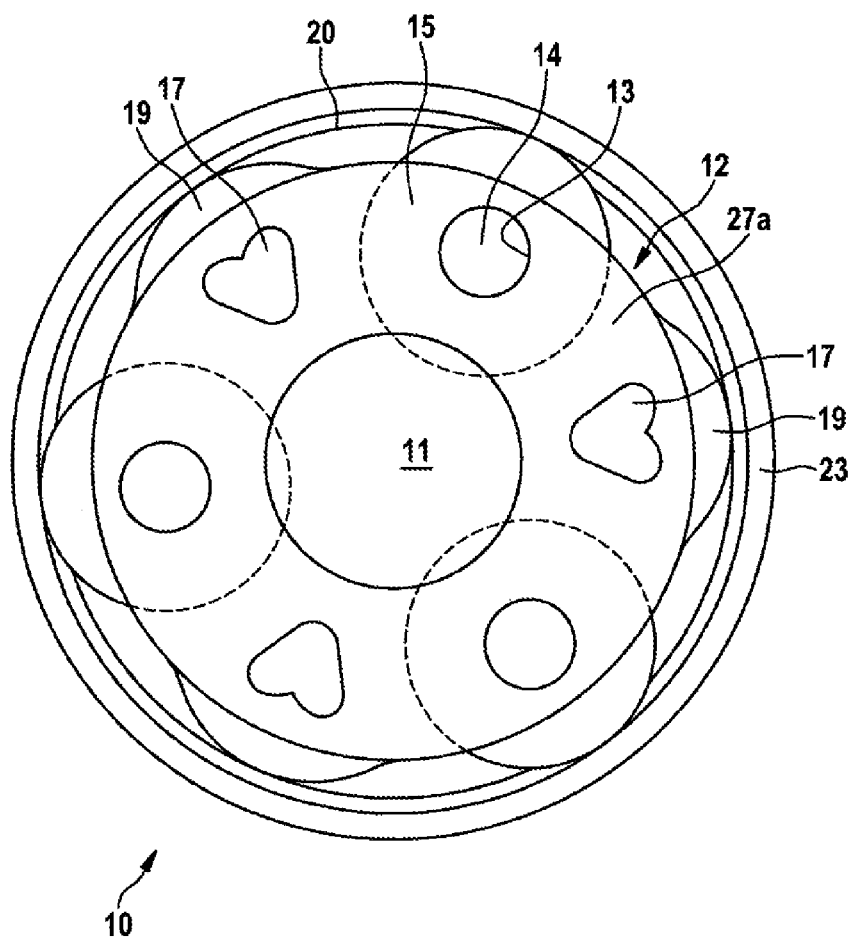
FIG. 2 shows an end-side sectional illustration of a planetary stage which is configured according to the disclosure.

FIG. 2 shows an end-side sectional illustration of the planetary stage 10 as a constituent part of the gear mechanism 4. The planetary stage 10 has an input shaft 11 which is connected directly or via a spur gear mechanism to the drive shaft 5. The input shaft 11 is connected to a planet spider 12, in particular is configured in one piece as a cast part. The planet spider 12 is of approximately annular configuration and has a total of three bores 13 which are arranged on the circumference of the planet spider 12 and into which planetary gear bolts 14 (see also FIG. 3) are inserted. Planetary gears 15 are mounted on the planetary gear bolts 14 via planetary gear bearings 16a, 16b. The planet spider 12 is composed of two cheeks 27a, 27b which are connected to one another. The cheek 27a faces the introduction of load/torque (that is to say the rotor side), whereas the cheek 27b faces the generator side. The cheeks 27a, 27b are connected via what are known as small heart-shaped formations 17 which serve primarily for said connection of the cheeks 27a, 27b and secondarily for the supply of lubricant to the gearwheels which mesh with one another, namely an internal gear 23, three planetary gears 15 and a sun gear 18 (FIG. 3).

Connecting webs 19 which protrude through the planet spider 12 and the cheek 27b are formed integrally on the cheek 27a of the planet spider 12. The connecting webs 19 are connected on the side of the cheek 27b to a connecting ring 20 or are configured in one piece, preferably as a cast part.

Figure 3:
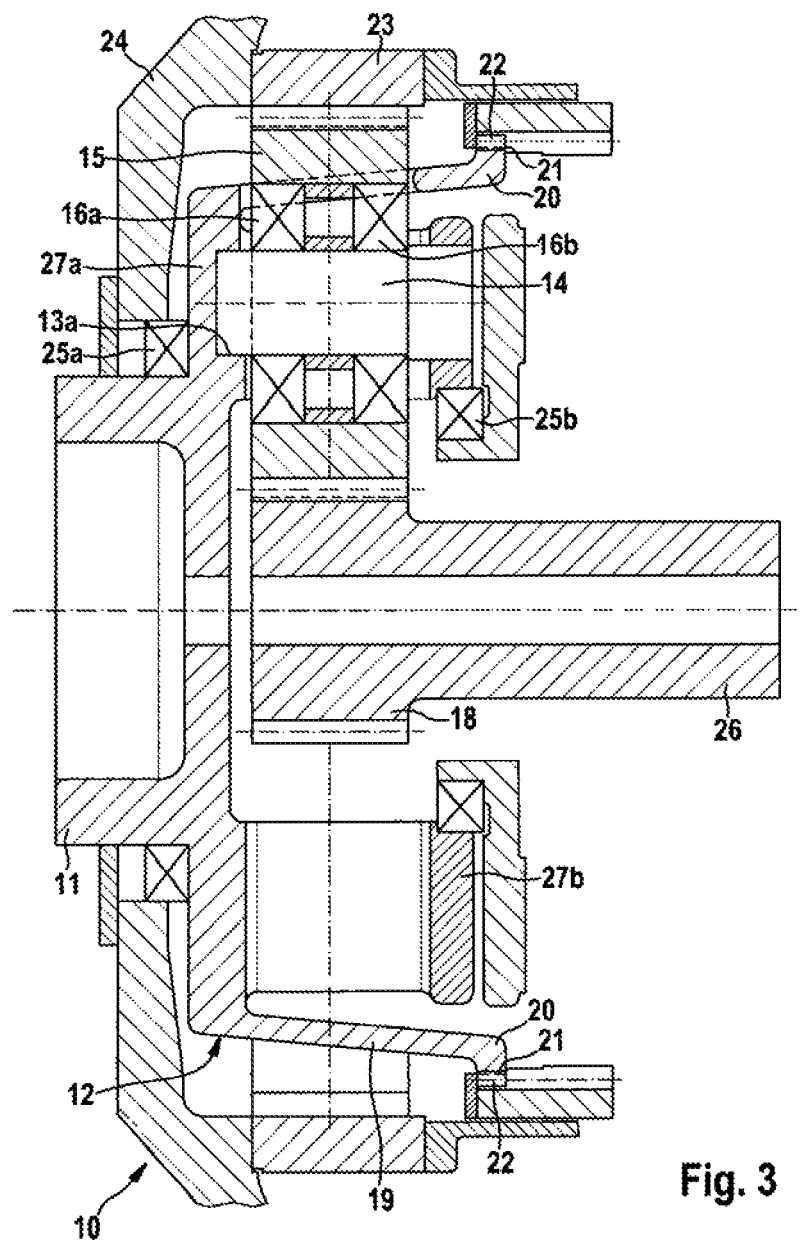
FIG. 3 shows a cross section through a planetary stage which is configured according to the disclosure.

According to FIG. 3, the connecting ring 20 is provided with an external toothing system 21 which interacts with an internal toothing system 22, in particular of an internal gear of a second planetary stage which is not shown in further detail. Here, the external toothing system 21 is configured in such a way that it can be plugged through the internal gear 23 of the first planetary stage 10. The internal gear 23 of the first planetary stage 10 is arranged in a rotationally fixed manner in the housing of the gear mechanism 4 via a torque support 24. A first bearing 25a and a second bearing 25b, in which the planet spider 12 or the input shaft 11 is mounted, are arranged in the housing and the torque support 24. If the input shaft 11 is moved rotationally, the planetary gears 15 run on the stationary internal gear 23 and set the sun gear 18 in a rotational movement which is transmitted preferably to a summing gear mechanism, via a sun gear shaft 26. At the same time, the internal gear of a second planetary stage is driven via the rotationally moved input shaft 11 by way of the connection according to the disclosure, which internal gear has a stationary planetary gear carrier. In the second planetary stage, correspondingly, a rotational movement is exerted on a sun gear of the second planetary stage which is likewise connected to the summing gear mechanism. Here, the sun gear of the second planetary stage is connected to a hollow shaft of the summing gear mechanism, whereas the sun gear 18 of the first planetary stage 10 is connected to a planetary gear carrier of the summing gear mechanism. The summed rotational movement is correspondingly output via a sun gear of the summing gear mechanism to the output shaft 6.

LIST OF DESIGNATIONS

1 Wind power plant
2 Tower
3 Nacelle
4 Gear mechanism
5 Drive shaft
6 Output shaft
7 Hub
8 Rotor blade
9 Generator
10 Planetary stage
11 Input shaft
12 Planet spider
13 Bore
14 Planetary gear bolts
15 Planetary gear
16a, 16b Planetary gear bearing
17 Small heart-shaped formation
18 Sun gear
19 Connecting web
20 Connecting ring
21 External toothing system
22 Internal toothing system
23 Internal gear
24 Torque support
25a, 25b Bearing
26 Sun gear shaft
27a, 27a Cheek

The invention claimed is:

1. A planetary stage of a planetary gear mechanism, comprising:
   a gear mechanism housing;
   an internal gear;
   a planet spider fixedly connected to an input shaft and including at least one cheek;
   at least two planetary gears mounted on the planet spider;
   a sun gear; and a connecting web arranged within the internal gear in a circumferential region defined between two adjacent planetary gears of the at least two planetary gears, the connecting web connecting the cheek to a component of a further planetary stage so as to rotationally couple the input shaft and the component of the further planetary stage, wherein the at least one cheek is loaded by an introduction of load/torque.

2. The planetary stage as claimed in claim 1, wherein the planetary stage includes an equal quantity of connecting webs and planetary gears.

3. The planetary stage as claimed in claim 1, wherein the connecting web is configured in one piece with the cheek.

4. The planetary stage as claimed in claim 1, wherein the at least one cheek is configured such that the load/torque introduced to the at least one cheek is divided in the cheek between the connecting web and the at least two planetary gears.

5. The planetary stage as claimed in claim 1, wherein the connecting web is connected to a connecting ring interposed between the connecting web and the component of the further planetary stage.

6. The planetary stage as claimed in claim 5, wherein one or more of the connecting web and the connecting ring is connected via a plug-in connection to an internal gear or a planetary gear carrier of the further planetary stage.

7. The planetary stage as claimed in claim 6, wherein the plug-in connection includes an external toothing system formed on the connecting ring and an internal toothing system arranged on the internal gear or the planetary gear carrier of the further planetary stage.

8. The planetary stage as claimed in claim 1, wherein the planetary gear mechanism is a continuous flow power plant gear mechanism.

9. The planetary stage as claimed in claim 8, wherein the continuous flow power plant gear mechanism is configured as an ocean current power plant gear mechanism or a wind power plant gear mechanism.

10. The planetary stage as claimed in claim 1, wherein the at least one cheek is shaped as an annular plate and is arranged on a first side of the at least two planetary gears.

11. The planetary stage as claimed in claim 1, wherein:
the at least one cheek includes a first cheek arranged on a first side of the at least two planetary gears facing the input shaft and a second cheek arranged on a second opposite side of the at least two planetary gears, and
the load/torque is introduced into the first cheek via the input shaft.

12. The planetary stage as claimed in claim 11, wherein the first cheek includes an annular plate.

13. The planetary stage as claimed in claim 11, wherein the planet spider includes a connecting structure connecting the first cheek to the second cheek, the connecting structure being separate from the connecting web and arranged in the circumferential region defined between the two adjacent planetary gears.

14. The planetary stage as claimed in claim 1, wherein the internal gear is fixedly arranged in the gear mechanism housing.

15. A wind power plant, comprising:
an input shaft;
a planetary gear mechanism including a planetary stage and a further planetary stage, the planetary stage including:
a gear mechanism housing;
an internal gear;
a planet spider fixedly connected to the input shaft and including at least one cheek;
at least two planetary gears mounted on the planet spider;
a sun gear; and
a connecting web arranged within the internal gear in a circumferential region between two adjacent planetary gears of the at least two planetary gears, the connecting web connecting the cheek to a component of the further planetary stage so as to rotationally couple the input shaft and the component of the further planetary stage,
wherein the cheek is loaded by an introduction of load/torque.

16. The wind power plant as claimed in claim 15, wherein the internal gear is fixedly arranged in the gear mechanism housing.

* * * * *